United States Patent
Godin et al.

(10) Patent No.: US 9,210,580 B2
(45) Date of Patent: Dec. 8, 2015

(54) NETWORK NODE CONTROL FOR PLURALITY OF CLUSTERS FOR MANAGING CHARACTERISTICS

(75) Inventors: Philippe Godin, Viroflay (FR); Hakon Helmers, Sceaux (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/575,440

(22) PCT Filed: Jan. 17, 2011

(86) PCT No.: PCT/EP2011/000164
§ 371 (c)(1),
(2), (4) Date: Oct. 17, 2012

(87) PCT Pub. No.: WO2011/091958
PCT Pub. Date: Aug. 4, 2011

(65) Prior Publication Data
US 2013/0040625 A1    Feb. 14, 2013

(30) Foreign Application Priority Data
Jan. 28, 2010 (EP) .................... 10360005

(51) Int. Cl.
*H04M 3/00* (2006.01)
*H04W 16/08* (2009.01)
*H04W 52/02* (2009.01)

(52) U.S. Cl.
CPC .......... *H04W 16/08* (2013.01); *H04W 52/0235* (2013.01); *H04W 52/0274* (2013.01)

(58) Field of Classification Search
CPC ............ H04W 16/08; H04W 52/0235; H04W 52/0274
See application file for complete search history.

(56) References Cited

U.S. PATENT DOCUMENTS

| | | | |
|---|---|---|---|
| 2004/0005905 A1* | 1/2004 | Petrus et al. ................. | 455/522 |
| 2006/0253736 A1 | 11/2006 | Rudolf et al. | |
| 2007/0287456 A1 | 12/2007 | Shimizu | |
| 2009/0017828 A1 | 1/2009 | Lee et al. | |

(Continued)

FOREIGN PATENT DOCUMENTS

| CN | 101087172 A | 12/2007 |
|---|---|---|
| JP | 2006-352477 A | 12/2006 |

(Continued)

OTHER PUBLICATIONS

English Bibliography for Japanese Patent Publication No. JP04642109B2, published Mar. 2, 2011, printed from Thomson Innovation on Sep. 10, 2014, 6 pp.

(Continued)

*Primary Examiner* — Keith Fang
(74) *Attorney, Agent, or Firm* — Fay Sharpe LLP

(57) ABSTRACT

Methods of controlling a network node, network nodes and a computer program product are disclosed. A method of controlling a network node includes, upon determining a proposed change to characteristics of the network node, providing a first indication of the proposed change to other network nodes within a predefined network node cluster of which the network node is a member; and, in the absence of a second indication from the other network nodes within the network node cluster rejecting the proposed change to the characteristics of the network node, making the proposed change to the characteristics of the network node.

17 Claims, 2 Drawing Sheets

(56) References Cited

U.S. PATENT DOCUMENTS

| | | | | |
|---|---|---|---|---|
| 2009/0197534 | A1* | 8/2009 | Stenberg | 455/41.3 |
| 2010/0002614 | A1 | 1/2010 | Subrahmanya | |

FOREIGN PATENT DOCUMENTS

| | | |
|---|---|---|
| JP | 4642109 B2 | 3/2011 |
| JP | 2011-527163 A | 10/2011 |
| KR | 10-2005-0016763 A | 2/2005 |
| WO | 2009063417 A1 | 5/2009 |
| WO | WO 2009/063417 A1 | 5/2009 |
| WO | WO 2009063417 A1 * | 5/2009 |
| WO | WO 2009/115554 A1 | 9/2009 |
| WO | 2010002991 A1 | 1/2010 |

OTHER PUBLICATIONS

English Bibliography for Japanese Patent Application Publication No. JP2006352477A, published Dec. 28, 2006, printed from Thomson Innovation on Sep. 10, 2014, 3 pp.

English Bibliography for Japanese Patent Application Publication No. JP2008538465A, published Oct. 23, 2008, printed from Thomson Innovation on Sep. 10, 2014, 5 pp.

English Bibliography for Japanese Patent Application Publication No. JP2011527163A, published Oct. 20, 2011, printed from Thomson Innovation on Sep. 10, 2014, 4 pp.

ZTE, "Energy Savings in LTE," 3$^{rd}$ Generation Partnership Project (3GPP), 3GPP RAN3#66bis Meeting, R3-100181, XP050424044, pp. 1-2, Valencia, Spain, Jan. 18-22, 2010.

ZTE, "LTE energy saving solution," 3$^{rd}$ Generation Partnership Project (3GPP), 3GPP TSG-RAN3 Meeting #66bis, R3-100182, XP050424045, pp. 1-27, Valencia, Spain, Jan. 18-22, 2010.

Huawei et al., "Energy Saving in UTRAN," 3$^{rd}$ Generation Partnership Project (3GPP), 3GPP TSG-RAN WG3#65bis, R3-092342, XP050391867, pp. 1-3, Miyazaki, Japan, Oct. 12-15, 2009.

Sujuan Feng et al., "Self-Organizing Networks (SON) in 3GPP Long Term Evolution," Nomor Research GmbH, XP002526917, pp. 1-15, May 20, 2008.

Ericsson, "Consideration on energy saving solutions in heterogeneous networks," 3$^{rd}$ Generation Partnership Project (3GPP), 3GPP TSG-RAN WG# #65bis, R3-092478, XP050391986, pp. 1-2, Miyazaki, Japan, Oct. 12-15, 2009.

Alcatel-Lucent, "Collaborative solution for energy saving using cell switch-off," 3$^{rd}$ Generation Partnership Project (3GPP), 3GPP TSG-RAN3 Meeting #67, R3-100877, XP050424693, pp. 1-58, San Francisco, USA, Feb. 22-26, 2010.

Alcatel-Lucent, "Introduction of intra-LTE energy saving use-case," 3$^{rd}$ Generation Partnership Project (3GPP), 3GPP TSG-RAN3 Meeting #67, R3-100876, XP050424692, pp. 1-2, San Francisco, USA, Feb. 22-26, 2010.

Alcatel-Lucent, "Intra-LTE energy saving solution: Cell switch off in a collaborative network," 3$^{rd}$ Generation Partnership Project (3GPP), 3GPP TSG RAN WG3 Meeting #67, R3-100875, XP050424691, pp. 1-4, San Francisco, USA, Feb. 22-26, 2010.

European Search Report for EP 10 36 0005 dated May 5, 2011.

International Search Report for PCT/EP2011/000164 dated May 12, 2011.

English Bibliography for Chinese Patent Publication No. CN101087172, published Dec. 12, 2007, printed from Thomson Innovation on Mar. 25, 2015, 3 pages.

English Bibliography for Korean Patent Publication No. KR2005016763A, published Feb. 21, 2005, printed from Thomson Innovation on Mar. 25, 2015, 4 pages.

* cited by examiner

NETWORK NODE CONTROL FOR PLURALITY OF CLUSTERS FOR MANAGING CHARACTERISTICS

FIELD OF THE INVENTION

The present invention relates to methods of controlling a network node, network nodes and a computer program product.

BACKGROUND

In many mobile telecommunications systems such as, for example, a third generation (3G) evolved universal terrestrial radio access network (E-UTRAN) telecommunications system, a number of base stations (E-UTRAN NodeBs—eNBs) are arranged to communicate with a number of user equipment (UEs). A number of channels are provided between the base stations and the user equipment to support this communication. Each base station is geographically separated from the others in order to provide communications coverage over a wide area. Also, each base station is typically arranged to support a number of "sectors" extending outwards from the base station location.

User equipment may establish a communications link with a base station when within its associated sector. As user equipment roams throughout the network, it will eventually leave its current sector and enter a new sector. When this happens, the current base station will need to "handover" the user equipment to a base station associated with that new sector. To assist in this process, the user equipment typically continually attempts to identify further base stations with which it may establish a communications link. Likewise, the network itself may derive information from the user equipment and indicate to the user equipment details of the most likely base station to which a handover may occur. The sectors generally overlap somewhat geographically to enable communication with an existing base station to be retained until communication with a new base station can be established and a handover can2 occur. It can be seen that this enables user equipment to roam throughout the network, with the user equipment being handed over from base station to base station.

It will be appreciated that this arrangement helps to ensure that user equipment can reliably establish a connection and enables the user equipment to roam through the network. However, a problem with the arrangement described above it that changes to each network node are difficult to administer.

Accordingly, it is desired to provide an improved technique for administering such changes.

SUMMARY

According to a first aspect, there is provided a method of controlling a network node, comprising the steps of: identifying, to said network node and other network nodes within a predefined network node controlling cluster for said network node, at least one proposed change to said network node; and in the absence of an indication from said other network nodes within said network node controlling cluster rejecting said at least one proposed change to said characteristics of said network node, subsequently making said at least one proposed change to said characteristics of said network node.

The first aspect recognises that controlling the characteristics of every network node within the network can be difficult to achieve. If the changes are controlled centrally then a great deal of information and signalling messages may be required to be provided to a centralised controller in order to enable that centralised controller to make configuration decisions and communicate these to each of the network nodes. Likewise, enabling every network node to make its own configuration changes based on the information it has available may lead to sub-optimal changes being made since insufficient information may be available to individual network nodes which may then make a configuration changes which is advantageous to that network node but which causes overall detriment to the network as a whole or to other network nodes. Also, whilst in some network arrangements (such as in a Universal Mobile Telecommunications System—UMTS), each network node, such as a base station, is under the control of a radio network controller (RNC) that has a view of the traffic beyond the particular base station, in other arrangements (such as in Long Term Evolution—LTE), there is no such RNC concept and the Radio Access Network (RAN) is flat consisting of distributed base stations. It is therefore particularly difficult in that type of architecture to find an appropriate technique for control.

Accordingly, proposed change to the characteristics of a network node can be identified. These changes may be predetermined between the network node and the controlling cluster or may be identified by the network node to the controlling cluster. Should no node in that cluster provide an indication rejecting the proposed change, then the network node is then able to make those changes to its characteristics should it decide to do so. That is to say, that although a proposed change has been identified as being allowed to occur, there is no obligation on the network to implement that change immediately. However, should any network nodes within the cluster determine that the proposed change to the characteristics of the network node would cause a detrimental effect to that other network node or should those other network nodes be able to determine that the proposed changes would be to the overall determinant of the network, then an indication is provided to prevent the network node from making the proposed changes. In other words, the network nodes within the controlling cluster can be considered to be 'masters' which control the operation of 'slave' network node, and no changes can be made by the slave network node without the agreement of all the master network nodes within the controlling cluster. This approach helps prevent network nodes from acting autonomously in a way that would be detrimental to other network nodes in the network. This approach is particularly efficient in an LTE architecture or other architectures having a generally flat network of base stations.

In one embodiment, said step of identifying comprises: upon determining a proposed change to characteristics of said network node, providing a first indication of said proposed change to said other network nodes within said predefined network node controlling cluster for said network node and said step of making comprises: in the absence of said indication from said other network nodes within said network node controlling cluster rejecting said proposed change to said characteristics of said network node, subsequently making said proposed change to said characteristics of said network node. Accordingly, when a network node determines that a proposed change to the characteristics of that node is to occur, it provides an indication of the change to other network nodes which belong to a predefined cluster which controls the network node. Should no node in the cluster provide an indication rejecting the proposed change, then the network node makes those changes to its characteristics. However, should any network nodes within the cluster determine that the proposed change to the characteristics of the network node would cause a detrimental effect to that other network node or should that other network node be able to determine that the proposed changes would be to the overall determinant of the network, then an indication is provided to prevent the network node from making the proposed changes. This approach helps prevent network nodes from acting autonomously in a way that would be detrimental to other network nodes in the network. This approach is particularly efficient in an LTE architecture or other architectures having a generally flat network of base stations.

In one embodiment, the step of providing comprises: providing the first indication by transmitting a message indicating the proposed changes to the other network nodes.

In one embodiment, said step of identifying comprises: identifying, to said network node and said other network nodes within said predefined network node controlling cluster for said network node, said at least one predetermined proposed change that may be made by said network node ; and said step of making comprises: subsequently making said at least one predetermined proposed change only when all other network nodes within said network node controlling cluster have each provided a second indication agreeing to said at least one predetermined proposed change.

Accordingly, one or more predetermined proposed changes to the network node may be pre-identified by both said network node and said controlling cluster. For example, it may be pre-identified that a network node may switch off or perform some other action or function whenever possible. This proposed change is known to both the network node and the controlling cluster. As network nodes within the controlling cluster determine that these pre-identified proposed changes can be made by the network node, this is identified to the network node. For example, network nodes within the controlling cluster may each determine, based on the conditions they are experiencing, that the network node may switch off and this is indicated to the network node either passively or actively. Once the network node determines that all of the network nodes in the controlling cluster agree to one of these pre-identified changes, the network node is then free to subsequently make that change, when convenient to do so. In this way, pre-agreed optimisations to the characteristics of the network node can be identified to the network nodes as being possible to make without the network node having to provide a request to the controlling cluster.

In one embodiment, the method comprises the step of: upon receipt of the indication from the one of said other network nodes within the network node cluster rejecting the proposed change to the characteristics of the network node, abandoning the proposed change to the characteristics of the network node. Accordingly, should the indication rejecting the proposed change be received from any network node within the cluster within a predetermined period, the proposed changes to the characteristics are abandoned.

In one embodiment, the method comprises the step of: upon receipt of the second indication from all the other network nodes within the network node controlling cluster accepting the proposed change to the characteristics of the network node, making the proposed change to the characteristics of the network node. Accordingly, the proposed changes may only be made after each network node within the cluster provides an indication that these changes are acceptable.

In one embodiment, the method comprises the step of: upon receipt of a third indication from one of said other network nodes within the network node controlling cluster requesting reinstatement of the characteristics of the network node, reversing changes made to the characteristics of the network node. Accordingly, even after the proposed changes to the characteristics have been made, should a subsequent indication be received from any network node within the cluster requesting reinstatement of the previous characteristics of the network node, those previous characteristics, which existed before the changes were made, are restored. It will be appreciated that this enables a network node within the cluster which did not anticipate that the changes that were going to be made to the network node would cause detriment, to make the network node reverse those changes should such detriment subsequently occur.

In one embodiment, the third indication from a network node within the network node cluster requesting reinstatement is received in a message from that network node.

In one embodiment, the proposed change is a change in transmission power of the transceivers. Accordingly, should an energy efficiency scheme be implemented which changes transmission power of the transceivers in order to conserve energy, the network node cannot change the transmission power autonomously without asking permission from all cells in its controlling cluster. Should any of the cells within the cluster object, then the changes in the transmission power cannot be made. Thereafter, once the changes are made, any request coming from the one of the cells within its controlling cluster will force the network node to reverse those changes. For example, if the change in transmission power is to reduce wireless coverage, this reduction cannot occur if any cells within the cluster object. As mentioned above, once the reduction in wireless coverage has been made, any request coming from any cell within the controlling cluster will force the sleeping cell to restore its coverage.

In one existing technique, used for configuring the power consumption characteristics of base stations, each base station is empowered to switch off autonomously. Using this technique, the base stations autonomously decide to switch themselves off during periods of, for example, low traffic activity. They then simply inform the other surrounding base stations that they have switched off or want to switch off. When one of the neighbouring base stations would like that base station to switch on again or doesn't accept that it should switch off, it sends a request to the sleeping cell to switch on again or not switch off and the sleeping cell can then accept that request or not. In other words, each base station is in full control of itself and decides to switch off without asking permission from the surrounding base stations and it decides whether or not to accept a request to switch on again itself.

This approach is not optimal because the base station that switches itself off may not have sufficient information regard the status of the neighbouring cells and their autonomous switch off may then create resources issues in a neighbouring cell. Also, once switched off, should any neighbour need assistance, (for example due to overload or some network failure) it cannot be certain that the sleeping cell will react positively to a request to switch on again to solve this difficultly.

In one embodiment, the proposed change is a switching off of wireless communications coverage provided to user equipment by the network node. Accordingly, should a power saving scheme be implemented in which network nodes attempt to switch off whenever possible in order to conserve power, the network nodes cannot switch off without asking permission from all network nodes in its controlling cluster. Should any of the network nodes within the controlling cluster object to the switching off, then the switch off cannot occur. Thereafter, once the changes are made, any request coming from the network nodes within its controlling cluster will force the network node to switch back on again.

In one embodiment, the proposed change is a switching of transceivers within the network node. Accordingly, should a network node wish to switch on or off its transceivers in order to change the wireless characteristics of the network node, then these are notified to the other network nodes within the controlling cluster prior to that switching taking place.

In one embodiment, upon receipt of an indication from one of said other network nodes within the network node controlling cluster requesting reinstatement of wireless communications coverage provided to user equipment by the network node, reversing changes made to the characteristics of the network node to restore wireless communications coverage provided to user equipment by the network node.

In one embodiment, the proposed change comprises a change in capacity of the network node.

In one embodiment, the proposed change is a change in radiation levels output by the network node.

In one embodiment, the proposed change is a change in interference levels caused by the network node.

In one embodiment, the network node controlling cluster comprises neighbouring network nodes of the network node. Accordingly, the cluster may comprise network nodes such as, for example, other macro base stations, micro base stations, femto base stations, pico base stations, etc.

In one embodiment, the network node provides local wireless communications coverage within wider wireless communications coverage provided by at least another network node and the controlling cluster comprises the at least another network node. Accordingly, the network may provide coverage within an overlaying umbrella cell. For example, the network node may be a femto base station within a macro cell. In this particular simple example, the cluster can be defined as being limited to the umbrella macro cell. In embodiments, therefore, the femto base station will only switch off if the umbrella macro base station does not object and will switch back on again as soon as the macro base station requests. The macro base station therefore becomes more or less in control of the sleeping mode of the femto base station. It should be noted that in previous techniques mentioned above, the opposite would have resulted, the femto base station would have been in control of itself regardless of the preference of the macro base station.

In one embodiment, the network node controlling cluster comprises network nodes of a differing radio access technology. Accordingly, the clusters may span network nodes from 2G, 3G and/or 4G or other technologies.

In one embodiment, the network node controlling cluster is a cluster of clusters. Accordingly, groups of clusters can be put together and any network node within the larger group may object to the proposed changes being made.

In one embodiment, the network node comprises a base station.

According to a second aspect, there is provided a network node, comprising: logic operable to identify at least one proposed change to said network node; and characteristic change logic operable, in the absence of an indication from other network nodes within a predefined network node controlling cluster for said network node rejecting said at least one proposed change to said characteristics of said network node, to subsequently make said at least one proposed change to said characteristics of said network node.

In one embodiment, the logic comprises: notifying logic operable, upon determining a proposed change to characteristics of the network node, to provide a first indication of the proposed change to said other network nodes within said predefined network node controlling cluster for the network node ; and said characteristic change logic is operable, in the absence of said second indication from the other network nodes within the network node controlling cluster rejecting the proposed change to the characteristics of the network node, to subsequently make the proposed change to the characteristics of the network node.

In one embodiment, the notifying logic is operable to provide the first indication by transmitting a message indicating the proposed changes to the other network nodes.

In one embodiment, said logic is operable to identify said at least one predetermined proposed change that may be made by said network node to said network node and said other network nodes within said predefined network node controlling cluster for said network node; and said characteristic change logic is operable to subsequently make said at least one predetermined proposed change only when all other network nodes within said network node controlling cluster have each provided a second indication agreeing to said at least one predetermined proposed change.

In one embodiment, the characteristic change logic is operable, upon receipt of the indication from the one of the other network nodes within the network node cluster rejecting the proposed change to the characteristics of the network node, to abandon the proposed change to the characteristics of the network node.

In one embodiment, the characteristic change logic is operable, upon receipt of the second indication from all the other network nodes within the network node controlling cluster accepting the proposed change to the characteristics of the network node, to make the proposed change to the characteristics of the network node.

In one embodiment, the characteristic change logic is operable, upon receipt of a third indication from one of the other network nodes within the network node controlling cluster requesting reinstatement of the characteristics of the network node, to reverse changes made to the characteristics of the network node.

In one embodiment, the third indication from a network node within the network node cluster requesting reinstatement is received in a message from that network node.

In one embodiment, the proposed change is a change in transmission power of the transceivers.

In one embodiment, the proposed change is a switching off of wireless communications coverage provided to user equipment by the network node.

In one embodiment, the proposed change is a switching of transceivers within the network node.

In one embodiment, the characteristic change logic is operable, upon receipt of an indication from one of the other network nodes within the network node controlling cluster requesting reinstatement of wireless communications coverage provided to user equipment by the network node, to reverse changes made to the characteristics of the network node to restore wireless communications coverage provided to user equipment by the network node.

In one embodiment, the proposed change comprises a change in capacity of the network node.

In one embodiment, the proposed change is a change in radiation levels output by the network node.

In one embodiment, the proposed change is a change in interference levels caused by the network node.

In one embodiment, the network node controlling cluster comprises neighbouring network nodes of the network node.

In one embodiment, the network node provides local wireless communications coverage within wider wireless communications coverage provided by at least another network node and the controlling cluster comprises the another network node.

In one embodiment, the network node controlling cluster comprises network nodes of a differing radio access technology.

In one embodiment, the network node controlling cluster is a cluster of clusters.

In one embodiment, the network node comprises a base station.

According to a third aspect, there is provided a method of controlling a network node, comprising the steps of: identifying at least one proposed change to a network node; determining whether said proposed change is likely to cause said network node to fail to achieve quality of service requirements; and providing an indication to said another network node rejecting said proposed change to said characteristics when it is determined that said proposed change is likely to cause said network node to fail to achieve quality of service requirements.

In one embodiment, the step of identifying comprises the step of: receiving a first indication of a proposed change to characteristics of said network node. According to a fourth aspect, there is provided a network node, comprising: identification logic operable to identify at least one proposed change to a network node; characteristic change determination logic operable to determine whether said proposed change is likely to cause said network node to fail to achieve quality of service requirements; and rejection logic operable, in response to an indication from characteristic change determination logic that said proposed change is likely to cause said network node to fail to achieve quality of service requirements, to provide an indication to said another network node rejecting said proposed change to said characteristics.

In one embodiment, the logic is operable to receive a first indication of a proposed change to characteristics of another network node.

According to a fifth aspect of the present invention, there is provided a computer program product operable, when executed on a computer, to perform the method steps of the first or third aspect.

In one embodiment, each network node within the cluster provides a status indication of one of allowed and disallowed to a network node being controlled regarding proposed change to the characteristics of that network node.

In one embodiment, the status indication of disallowed aims to prevent the network node being controlled from changing characteristics or aims to restore a characteristic of the network node.

In one embodiment, a network node being controlled is operable to receive a status indication of one of allowed and disallowed from another network node belonging to a cluster of one or several other network nodes whereby the network node is allowed to change its characteristics only in case it has received a status indication of allowed from all the network nodes that belong to the cluster.

In one embodiment, a network node being controlled is operable to receive a status indication of one of allowed and disallowed from another network node belonging to a cluster of one or several other network nodes whereby the said network node is prompted and triggered to restore a characteristic as soon as it receives the status indication of disallowed from at least one of the network nodes that belong to the cluster.

Further particular and preferred aspects are set out in the accompanying independent and dependent claims. Features of the dependent claims may be combined with features of the independent claims as appropriate, and in combinations other than those explicitly set out in the claims.

BRIEF DESCRIPTION OF THE DRAWINGS

Embodiments of the present invention will now be described further, with reference to the accompanying drawings, in which.

DESCRIPTION OF THE EMBODIMENTS

Figure 1:
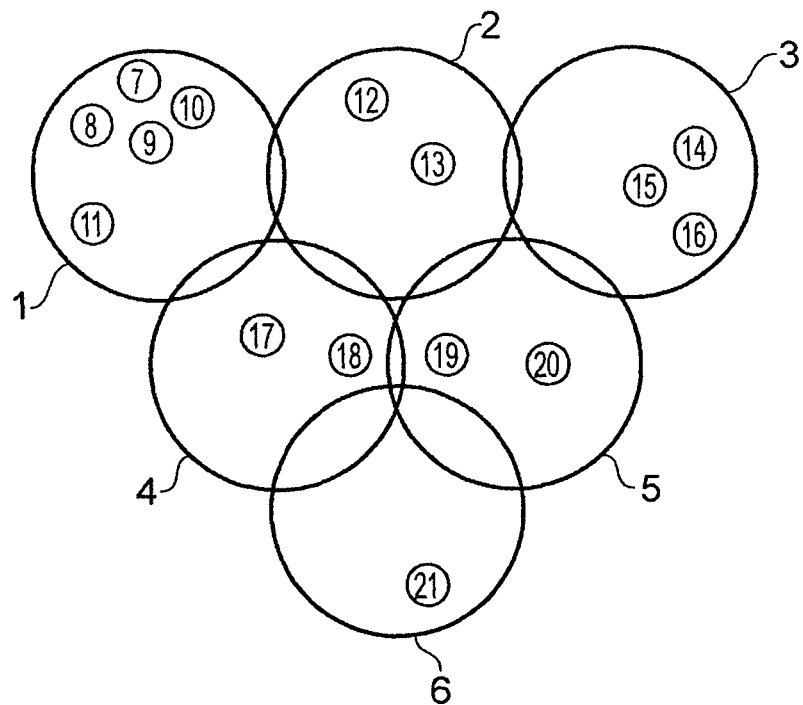
FIG. 1 illustrates an example arrangement of network nodes according to one embodiment.

FIG. 1 illustrates an example arrangement of network nodes according to one embodiment. In this arrangement, the network nodes are each base stations, although it will be appreciated that the present technique is also applicable to other types of network nodes. Each base station supports a corresponding cell. For example, in FIG. 1, there are provided six macro cells (1 to 6), each of which is supported by a corresponding macro cell base station. Likewise, there are provided 15 femto cells (7 to 21), each of which is supported by a corresponding femto base station. It will be appreciated that other sized cells, such as micro or pico cells may also be provided supported by corresponding base stations which may also utilise the present technique. Also, all of these cells need not necessarily utilise the same radio access technology and instead may utilise different radio access technologies (for example, the some of the macro base stations may be 3G, but some of the femto base stations may be 4G).

Each of the base stations is associated with a controlling cluster. Furthermore, each base station may be associated with more than one controlling cluster. A cluster is an arrangement of associated base stations. As will be explained in more detail below, base stations associated with a cluster advise other base stations within that cluster of any proposed changes to their characteristics. The base stations within the controlling cluster collectively act as a "master" to the "slave" base station. In particular, a base station can not make a change to its characteristics without the agreement (either explicitly or implicitly) from all the base stations within the controlling cluster and must reverse any changes made should any one of the base stations within the controlling cluster request.

Various different cluster arrangements are possible. For example, it is possible to cluster base stations of the same type, of different types, neighbouring or non-neighbouring, irrespective of the radio access type associated with that base station. Furthermore, it is possible to cluster smaller clusters together to form larger clusters. One example cluster arrangement may comprise all the other femto base stations within a macro cell. For example, one controlling cluster for the femto base station associated with femto cell 17 may comprise the femto base station associated with femto cell 18 in macro cell 4. Likewise, another example controlling cluster may comprise only the base stations appearing within the neighbour list of a particular base station. For example, one controlling cluster for the femto base station associated with femto cell 7 may comprise the femto base stations associated with femto cells 8 to 10 or for the macro base station associated with macro cell 1 may comprise the macro base stations associated with macro cells 2 and 4. Likewise, another example controlling cluster may comprise a base station associated with a cell located within another cell. For example, a controlling cluster for the femto base station associated with femto cell 12 may comprise the macro base station associated with macro cell 2. Such controlling clusters, when utilised to determine whether a base station may be allowed to switch off or enter a sleeping mode, will be described hereinafter as an "equivalent sleeping cluster".

Figure 2:
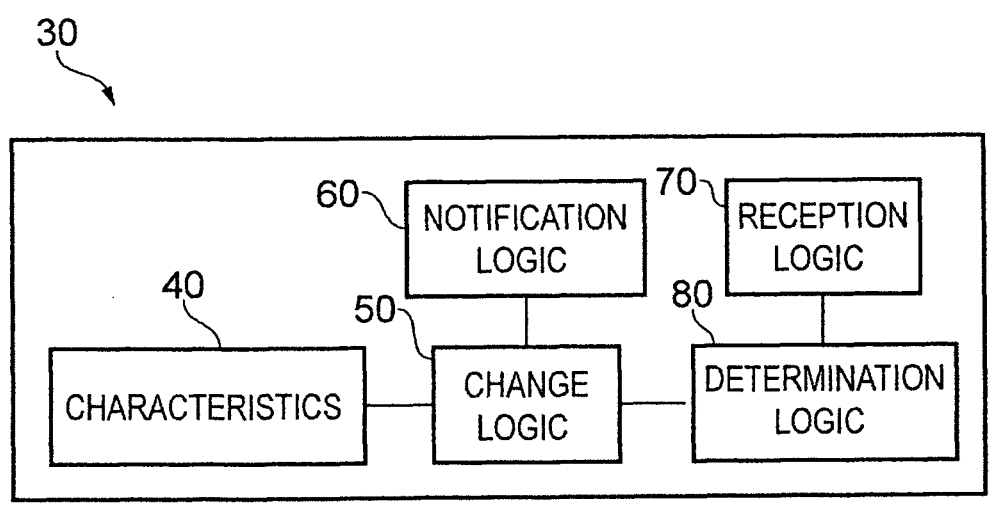
FIG. 2 illustrates an arrangement of a network node such as, for example, a base station according to one embodiment.

FIG. 2 illustrates an arrangement of a network node such as, for example, a base station 30 according to one embodiment. The base station 30 maintains a characteristics table 40 indicative of the characteristics of that base station 30. For example, the characteristics table 40 may comprise information on the operative state of the base station 30, the status of the base station's transceivers, the power level of those transceivers, the capacity of the base station, the radiation of levels of the base station, or any other operative characteristics.

Change logic 50 is provided which is operable to determine that changes to these characteristics may be necessary in order to, for example, save power, change the capacity of the base station 30, reduce interference, reduce radiation emitted, etc. The change logic 50 determines a proposed change to the characteristics of the base station 30 and utilises notification logic 60 to provide details of these proposed changes to other network nodes within that base station's cluster, as will be set out in more detail below.

The other network nodes within the controlling cluster has similar logic provided therein and receive that notification of the proposed change using their reception logic 70. The proposed change is then passed to determination logic 80 which assesses the impact of those changes based on information available to that network node. For example, if the network node is only able to assess the impact of the changes on itself, then the determination logic 80 assesses the impact of the proposed changes on that network node and determines whether those changes would be acceptable. For example, the determination may model characteristics of the network node using information it has on the user equipment of which it is aware and an estimated service requirement of that user equipment, and then determine whether those service requirements or any quality of service requirements can still be met with the changes proposed to the base station 30 within its cluster. The result of that determination may then be communicated back to the originating base station, as will also be described in more detail below.

Should the originating base station 30 not receive a notification indicating that the proposed changes are unacceptable to network nodes within the controlling cluster, then that base station may implement those changes when convenient and update its characteristics table 40 when the changes have been made. Alternatively, the originating base station 30 may be configured only to make the proposed changes once it receives a positive indication from the other network nodes within its cluster. If any of the network nodes within the controlling cluster reject the changes, then the base station 30 will abandon the proposed changes.

Typically, the base station 30 also retains information on the original characteristics which have been changed. Should any network node within the cluster subsequently determine that the changes are no longer acceptable because that network node is now having difficulty achieving its service requirements or quality of service levels or because of other network considerations, that network node may then signal the base station 30 requesting that it reverses the changes made. On receipt of that message, the base station 30 restores the characteristics to their original value.

For example, base stations within a cluster may have an energy saving requirement requiring them to switch off their cells whenever possible in order to reduce power consumption. The base stations within the cluster form an equivalent sleeping cluster. Should a base station determine that it is able to switch off coverage because, for example, it is not currently supporting any user equipment, the proposed switching off of the cell coverage is communicated to other base stations within the equivalent sleeping cluster. Should any of those other base stations realise that switching off the cell will cause unacceptable detriment to other base stations or to user equipment then that base station will signal the base station proposing to switch off and prevent the switch off from occurring. Likewise, should a base station within the controlling cluster detect that such detriment starts to occur sometime after the base station has switched off, the base station can be signalled to switch back on again and the inactive base station must comply.

Figure 3:
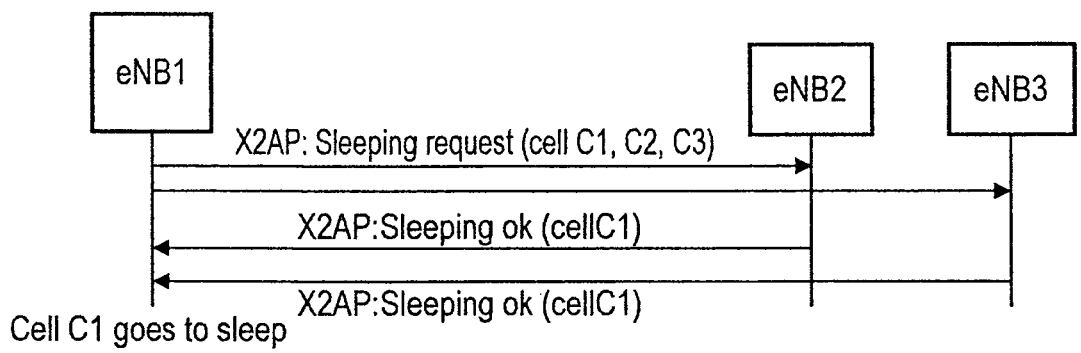
FIGS. 3, 4 and 5 illustrate an example signal arrangement utilised by network nodes within a cluster according to one embodiment.
Figure 4:
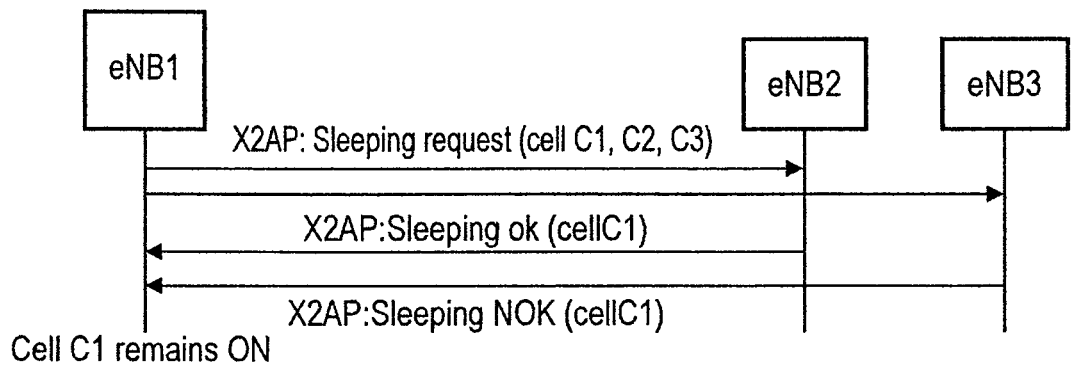
Figure 5:
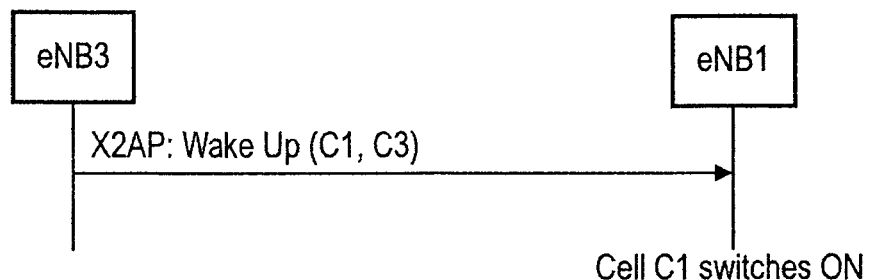

FIGS. 3, 4 and 5 illustrate an example signal arrangement utilised by network nodes within a controlling cluster. In this example, all messages are sent over the X2 interface for intra-LTE communications. However, it will be appreciated that other signally interfaces may be used for other architectures or technologies.

FIG. 4 illustrates the arrangement where base station ENB1 determines that it wishes to switch off and sends a sleeping request message to base station ENB2 and base station ENB3 (which are within the equivalent sleeping cluster for base station ENB1). Both base station ENB2 and base station ENB3 determine that is it acceptable for base station ENB1 to switch off and so they both send a message to base station ENB1 indicating that the switch off is acceptable. On receipt of those messages from the base stations with the equivalent sleeping cluster, base station ENB1 then switches off.

FIG. 4 illustrates a similar arrangement to FIG. 3. However, in this arrangement, base station ENB3 determines that the switch off of base station ENB1 would be unacceptable. Accordingly, base station ENB3 sends a message to base station ENB1 indicating that the switch off is not acceptable. Accordingly, on receipt of that message, base station ENB1 abandons the proposed switch off and instead stays active.

FIG. 5 illustrates the operation of a network node within the controlling cluster which wishes to subsequently reverse a change that has been made to the network node it controls. In this example, base station ENB1 has previously been switched off. When the switch off occurred, none of the base stations within the equivalent sleeping cluster considered the switch off to be unacceptable. However, base station ENB3 now determines that it is necessary for the inactive base station ENB1 to switch back on again. Accordingly, a wake up message is sent from base station ENB3 to base station ENB1. On receipt of that wake up message, base station ENB1 switches back on.

In another arrangement, particular predetermined configurations for the network nodes are pre-identified in both the network node itself and those network nodes forming the controlling cluster. For example, it may be an objective or policy of a network node to switch off whenever it is not required by the network nodes of its controlling cluster. This might occur when the network node is only provided to give additional capacity to those network nodes in the controlling cluster when required. Of course, it will be appreciated that other objectives such as reducing interference, reducing emissions, maximising quality of service, etc may be pre-identified.

In this arrangement, each of the network nodes within the controlling cluster may continuously or periodically determine whether they can achieve particular service levels or quality of service requirements should the characteristics of the network node being controlled change to meet those objectives in a similar manner to that indicated above. In other words, each of the network nodes within the controlling cluster determines whether these changes to the network node being controlled would be acceptable.

The outcome of that determination may then be indicated to the network node being controlled either actively or passively. For example, each network node within the controlling cluster may indicate only when the changes would be acceptable to that network node, indicate only when the changes would be not acceptable to that network node or may indicate both.

When the network node identifies that every network node within its controlling cluster has indicated that a change to its characteristics may be made, the network node can then determine whether or not to make those changes to its characteristics.

Through this approach, it can be seen that no indication need necessarily be provided from the network node being controlled each time a change to its characteristics is desired. Instead, the network nodes within the controlling cluster may monitor themselves whether those changes could be made and identify to the network node being controlled when they consider that such a change is possible.

Of course, in a similar manner to that described above, should any network node within the controlling cluster determine that those changes need to be reversed, this can be indicated to the network node who must comply and reverse those changes.

Hence, each slave has a network cluster with one or more masters and may operate in the following way: in order for a change to take place in the slave, the latter must receive approval from all the "masters" of the cluster; any "master" in the cluster may at every moment revoke its approval, and the "slave" shall then return to the initial configuration. If a binary transition arrangement is considered (e.g. "on"/"off"), the masters could automatically send their approval once permitted by the operating conditions (load). Vice versa, the masters may automatically revoke their approval when needed. Similarly: all the nodes of the controlling cluster may only provide an up-to-date status "allowed, not allowed" to the slave they control to say if they allow or not the change in the slave; whenever the slave wants to make its change, it can only make it if the current status from all the controlling cluster nodes are at "allowed"; later on, if the change has been made, upon reception of a single status set to "disallowed", the slave must come back to the original configuration.

Accordingly, it can be seen that a technique is provided which enables characteristics of network nodes to be changed in a safe and cooperative manner. This enables each network node to make its own assessment of changes that could be made, but enables the impact of those changes to be assessed locally by an appropriate cluster of network nodes. This avoids the need for the configuration of every network node to be provisioned centrally, which reduces complexity of the core network and the signalling that would otherwise be required to enable the core network to make such changes. Also, the cooperative nature of the technique prevents one network node making a change which would be to the unacceptable detriment of other network nodes. In particular, the present technique provides a safer energy saving solution in a flat, distributed ran network such as an LTE network. This provides power saving benefits to the operator and cuts overall $CO_2$ emissions.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of controlling a network node, comprising:
identifying, to said network node and other network nodes within a predefined network node controlling cluster for said network node comprising neighbouring network nodes of the network node, at least one proposed change to characteristics of said network node;
in the absence of an indication from said other network nodes within said network node controlling cluster rejecting said at least one proposed change to said characteristics of said network node, subsequently making said at least one proposed change to said characteristics of said network node; and
after receipt of an indication requesting reinstatement of the characteristics of the network node from at least one of the other network nodes within the network node controlling cluster, reversing changes made to the characteristics of the network node;
wherein said proposed change is at least one of a change in transmission power of transceivers within said network node, a switching off of wireless communications coverage provided to user equipment by said network node, a switching of the transceivers within said network node, a change in capacity of said network node, a change in radiation levels output by said network node, and a change in interference levels caused by said network node.

2. The method of claim 1, further comprising:
upon determining the at least one proposed change to the characteristics of said network node, providing a request for said at least one proposed change to the characteristics to said other network nodes within said predefined network node controlling cluster for said network node; and
in the absence of said indication from said other network nodes within said network node controlling cluster rejecting said proposed change to said characteristics of said network node, subsequently making said at least one proposed change to said characteristics of said network node.

3. The method of claim 1, further comprising:
identifying, to said network node and said other network nodes within said predefined network node controlling cluster for said network node, said at least one proposed change to be made by said network node; and
subsequently making said at least one proposed change after the other network nodes within said network node controlling cluster have each provided an indication agreeing to said at least one proposed change.

4. The method of claim 1, wherein said network node controlling cluster comprises at least one of neighbouring network nodes of said network node, network nodes of differing radio access technologies, and a cluster of clusters.

5. The method of claim 1, wherein said network node provides local wireless communications coverage within wider wireless communications coverage provided by at least one other network node, said controlling cluster comprising said at least one other network node.

6. A network node, comprising:
an identification logic device configured to identify at least one proposed change to characteristics of said network node; and
a characteristic change logic device configured, in the absence of an indication from other network nodes within a predefined network node controlling cluster comprising neighbouring network nodes of the network node for said network node rejecting said at least one proposed change to said characteristics of said network node, to subsequently make said at least one proposed change to said characteristics of said network node;
wherein the characteristic change logic device is configured, after receipt of an indication requesting reinstatement of the characteristics of the network node from at least one of the other network nodes within the network node controlling cluster, to reverse changes made to the characteristics of the network node;
wherein the proposed change is at least one of a change in transmission power of transceivers within the network node, a switching off of wireless communications coverage provided to user equipment by the network node, a switching of the transceivers within the network node, a change in capacity of the network node, a change in radiation levels output by the network node, and a change in interference levels caused by the network node.

7. The network node of claim 6, further comprising:
a notifying logic device configured, upon determining the at least one proposed change to the characteristics of said network node, to provide a request for said at least one proposed change to the characteristics to said other network nodes within said predefined network node controlling cluster for said network node;
wherein said characteristic change logic device operates, in the absence of said indication from said other network nodes within said network node controlling cluster rejecting said proposed change to said characteristics of said network node, to subsequently make said at least one proposed change to said characteristics of said network node.

8. The network node of claim 6, wherein said identifying logic device is configured to identify said at least one proposed change to be made by said network node;
wherein said characteristic change logic device is configured to subsequently make said at least one proposed change after the other network nodes within said network node controlling cluster have each provided an indication agreeing to said at least one proposed change.

9. The network node of claim 6, wherein the network node controlling cluster comprises at least one of neighbouring network nodes of the network node, network nodes of differing radio access technologies, and a cluster of clusters.

10. The network node of claim 6, wherein the network node provides local wireless communications coverage within wider wireless communications coverage provided by at least one other network node, the controlling cluster comprising the at least one other network node.

11. The network node of claim 6, wherein the indication requesting reinstatement of the characteristics of the network node was sent by the at least one of the other network nodes within the network node controlling cluster after the corresponding other network node determined the change to the characteristics of the network node created a detrimental effect on the corresponding other network node.

12. The network node of claim 11, wherein the detrimental effect was not anticipated by the corresponding other network node before the change to the characteristics of the network node was made by the network node.

13. A non-transitory computer-readable medium storing program instructions that, when executed by a computer, cause a corresponding computer-controlled device to perform a method of controlling a network node, the method comprising:
identifying, to the network node and other network nodes within a predefined network node controlling cluster for the network node comprising neighbouring network nodes of the network node, at least one proposed change to characteristics of the network node;

in the absence of an indication from the other network nodes within the network node controlling cluster rejecting the at least one proposed change to the characteristics of the network node, subsequently making the at least one proposed change to the characteristics of the network node; and after receipt of an indication requesting reinstatement of the characteristics of the network node from at least one of the other network nodes within the network node controlling cluster, reversing changes made to the characteristics of the network node;

wherein said proposed change is at least one of a change in transmission power of transceivers within said network node, a switching off of wireless communications coverage provided to user equipment by said network node, a switching of the transceivers within said network node, a change in capacity of said network node, a change in radiation levels output by said network node, and a change in interference levels caused by said network node.

14. The method of claim 1, wherein the indication requesting reinstatement of the characteristics of the network node was sent by the at least one of the other network nodes within the network node controlling cluster after the corresponding other network node determined the change to the characteristics of the network node created a detrimental effect on the corresponding other network node.

15. The method of claim 14, wherein the detrimental effect was not anticipated by the corresponding other network node before the change to the characteristics of the network node was made by the network node.

16. The non-transitory computer-readable medium of claim 13, the method further comprising:

providing a request for the at least one proposed change to the characteristics to the other network nodes within the predefined network node controlling cluster for the network node after determining the at least one proposed change to the characteristics of the network node; and making the at least one proposed change to the characteristics of the network node in the absence of the indication from the other network nodes within the network node controlling cluster rejecting the proposed change to the characteristics of the network node.

17. The non-transitory computer-readable medium of claim 13, the method further comprising:

identifying the at least one proposed change to be made by the network node to the network node and the other network nodes within said predefined network node controlling cluster for the network node; and making the at least one proposed change after the other network nodes within said network node controlling cluster have each provided an indication agreeing to the at least one proposed change.

* * * * *